June 29, 1954
A. E. SCHUBERT ET AL
2,682,193
METHOD OF LATERALLY ALIGNING THE IMAGES
OF DOCUMENTS ON FILM STRIPS
Filed March 10, 1951
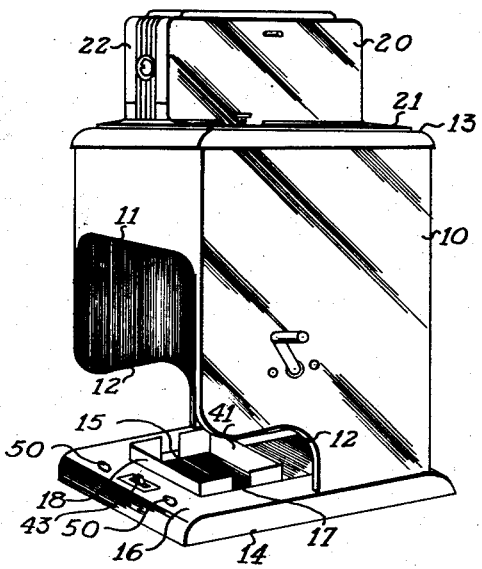
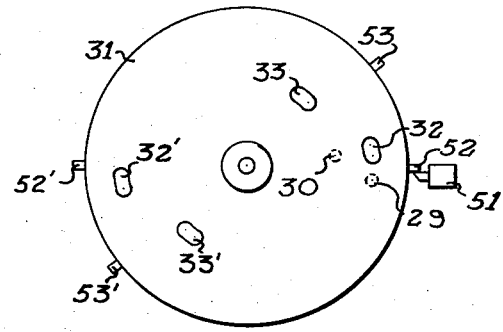
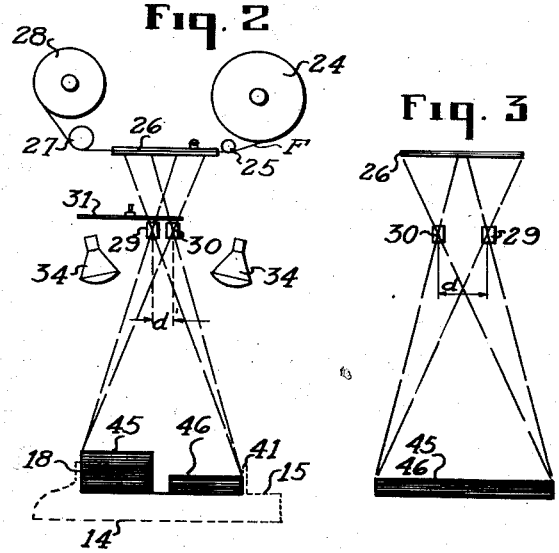
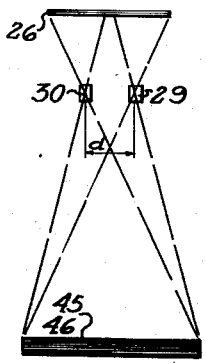
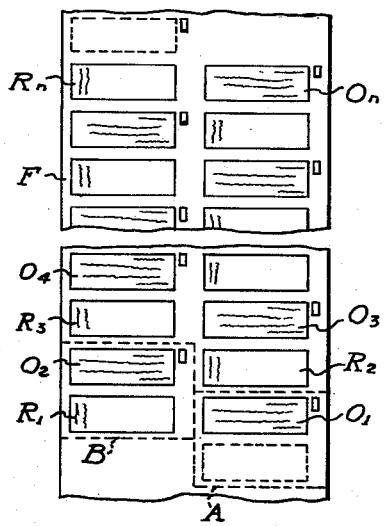
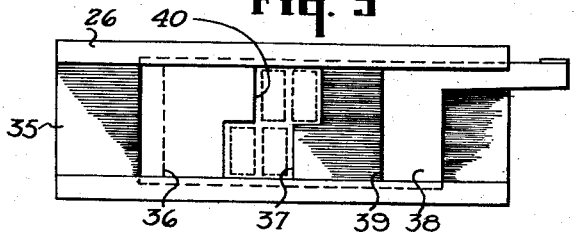
ALVIN E. SCHUBERT
WADE S. NIVISON
INVENTORS
BY Daniel J. Mayne
ATTORNEY — AGENT Patented June 29, 1954

2,682,193

UNITED STATES PATENT OFFICE 2,682,193

METHOD OF LATERALLY ALIGNING THE IMAGES OF DOCUMENTS ON FILM STRIPS

Alvin E. Schubert and Wade S. Nivison, Rochester, N. Y., assignors to Eastman Kodak Company, Rochester, N. Y., a corporation of New Jersey Application March 10, 1951, Serial No. 214,952

5 Claims. (Cl. 88—24)

1

This invention relates to photography and more particularly to a method of photographically copying documents in which the obverse and reverse sides of successive documents are photographed simultaneously and the latent images of the same document are spaced transversely of the film strip.

It is well known in the art of photographically copying documents that the latent images of the obverse and reverse sides of a document can be arranged in spaced-apart relationship transversely of the film strip. This is usually accomplished by continuously feeding the document past two photographing stations or apertures which are usually aligned for scanning transverse areas of both sides of the same document simultaneously. By means of mirrors angularly disposed with respect to the apertures, the reflected document images are directed into a projection lens which images the two sides of the document transversely of the moving film strip in spaced-apart relationship. In this type of document copying apparatus the movement of the film strip must be in synchronism with the movement of the document and, consequently, necessitates considerable mechanism and various control devices.

In many instances the number of documents or checks handled in the normal course of business does not warrant the use of such a complex and fully automatic machine. For such limited use a combination copying and projection machine, such as disclosed in U. S. Patents Nos. 2,180,007 and 2,213,734 issued to R. S. Hopkins on November 14, 1939, and September 3, 1940, respectively, may be used. This apparatus, however, requires that each document or check be photographed individually with the images on the film being spaced longitudinally thereof. If both sides of the document or check are to be photographed, then each side must be photographed separately with the images arranged longitudinally of the film strip. When these images are then projected, the viewer must first observe the image of one side of the document and then advance the film so that the image of the other side of the same document may be observed. Accordingly, the viewer has no way of visually comparing the two sides of the same document as when the two images are in spaced-apart relationship transversely of the film strip.

In the present invention a method has been devised whereby apparatus similar to that disclosed in the above-mentioned patents may be utilized to obtain a photographic record in which

2 the obverse and reverse sides of the same document are spaced-apart transversely of the film strip. This is accomplished by utilizing two offset objectives and arranging the documents in stacks in the common field of the objectives. The uppermost documents on each stack are photographed through one of the objectives, the uppermost document on one stack is then transferred to the other stack face down so that one stack has the reverse side uppermost and the other stack has the obverse side uppermost, and the stacks are then photographed through the other objective. After both stacks have been photographed through each objective with the transfer and turning over of the document taking place between the photographing steps, the film strip is advanced. By utilizing offset objectives the stacks are imaged first on one-half of the film and then on the other half of the film, and since the objectives are offset in two dimensions, the images are displaced longitudinally of the film strip as well as laterally or transversely. Because the stacks are arranged adjacent to each other, the obverse and reverse images of the same document are spaced transversely of the film strip, and the obverse and reverse images of successive documents are alternately spaced longitudinally of the film strip.

The primary object of the invention, therefore, is to provide a method of photographically copying a plurality of documents whereby the obverse and reverse sides of different documents are photographed simultaneously and the images are collocated so that the two sides of the same document are arranged in spaced-apart relation transversely of the film.

Another object of the invention is to provide a method of photographically copying a plurality of documents whereby the obverse and reverse sides of different documents are photographed simultaneously and the images are collocated so that the two sides of the same document are arranged in spaced-apart relation transversely of the film and the obverse and reverse images of successive documents are arranged in spaced-apart relation longitudinally of the film.

And yet another object of the invention is to provide a method of photographically copying a plurality of documents arranged in a pair of adjacent stacks in the common field of two offset objectives whereby the images of the obverse and reverse sides of the same document are arranged in spaced-apart relation transversely of the film to permit observance of both sides of the document during projection without having to move the film strip and to increase the number of documents recorded on a length of film.

These and other objects and advantages will be apparent to those skilled in the art by the description which follows.

The objects of the invention are embodied in the photographic recording on a length of film of the obverse and reverse sides of each of a series of documents and the method of collocating the records so that the two sides of each document occupy adjacent transverse areas of the film. The method comprises arranging a plurality of documents in a pair of adjacent stacks and in the common field of two offset objectives, photographing the uppermost document on both stacks through one of said objectives whereby latent images are formed in one area of said film, transferring the documents one at a time from one stack to the other of said stacks and during the transfer turning the document over so that a series of different aspects are presented, photographing the uppermost document on both stacks through the other of said objectives whereby latent images are formed in another area of said film displaced laterally thereof from said first-mentioned area and longitudinally of said film by a distance substantially equal to one-half the length of said area, the images of the obverse and reverse sides of the same document being in spaced-apart relationship transversely of said film and the obverse and reverse images of successive documents being alternately spaced longitudinally of said film, and advancing an unexposed area of film into the focal plane of said objectives after said stacks have been photographed through both of said objectives.

Reference is now made to the accompanying drawings wherein like reference numerals designate like parts and wherein:

Fig. 1 is a perspective view of a photographic copying apparatus which may be utilized for performing the method in accordance with the invention;

Fig. 2 is a diagrammatic side elevation of the apparatus shown in Fig. 1 and showing the arrangement of the stacks of documents in the common field of the offset objectives;

Fig. 3 is a digrammatic front elevation showing the manner in which the offset objectives project the document to one side or the other of the film depending on the objective used;

Fig. 4 is a view of a film strip exposed by the method in accordance with the invention and showing the arrangement of the images of the obverse and reverse sides of the document thereon;

Fig. 5 is a detail plan view of the film gate and showing the aperture therein; and Fig. 6 is a detail plan view of a shutter and showing the arrangement of the exposure apertures.

The apparatus disclosed in Fig. 1 is similar to that described in the above-mentioned Hopkin's patents. Such apparatus comprises a casing 10 provided with a front opening 11 and openings 12 in the side walls thereof, a top wall 13 and a base or copyholder 14 which has a document receiving or supporting area 15. The copyholder 14 has a top wall 16 and is provided with a recessed portion 17 which has a stationary abutment 18 at one end thereof against which the documents to be copied are located. The copying camera 20 comprises a base plate 21 secured to top wall 13 of casing 10 and a camera housing 22 having film supply and film take-up compartments. The path of film F extends from film supply reel 24 under guide roller 25, through film gate 26, under guide roller 27 and to take-up reel 28, as shown in Fig. 2.

Objectives 29 and 30 are mounted below film gate 26 and are offset both transversely and longitudinally with respect to film strip F. A shutter 31 is rotatably mounted between objectives 29 and 30 and film gate 26 and is provided with a pair of offset elongated apertures 32 and 33 and a second pair of offset apertures 32' and 33' arranged diametrically opposite said first-mentioned apertures, as shown in Fig. 6. The common field of objectives 29 and 30 is illuminated by lamps 34 which are mounted within casing 10. The lamps 34 are controlled by switch 43 which has three positions, a neutral or central position in which the entire apparatus is inoperative, a copying position in which the switch is moved to the left for energizing lamps 34 and the film and shutter drive motor, and a projecting position in which the switch is moved from the neutral position to the right for energizing the projection lamp. The gate member 26, as shown in Fig. 5, comprises a fixed member 35 having an aperture 36 the edge 37 of which is offset as shown in Fig. 5, and a movable member 38 which is slidably mounted on member 35 and provided with an aperture 39 having an offset edge 40. As disclosed and described in the above Hopkins Patent 2,213,734, the member 38 is operatively connected to movable guide member 41 which is slidably mounted on the recessed portion 17 and upon movement thereof alters the aperture in gate member 26 formed by edges 37 and 40 in accordance with the length of field occupied by stacks 45 and 46.

To photograph a plurality of checks so that the images of the obverse and reverse sides of the same check are spaced transversely of the film F, as shown in Fig. 4, the operator first arranges the checks in a stack 45 with the obverse side or face of the checks being uppermost. Stack 45 is then positioned in recessed portion 17 and adjacent abutment 18. The uppermost check on stack 45 is then positioned adjacent stack 45 and parallel thereto, as shown in Fig. 2 to form a second stack 46 and movable guide member 41 is moved against the right hand edge of stack 46 to position edge 40 of movable gate member 38 with respect to edge 37 of fixed gate member 35 and thereby determine the aperture size formed by edges 37 and 40. The check representing stack 46 is then returned to stack 45 and assuming that film has been threaded through camera 20 and switch 43 has been moved to the left to energize lamps 34 and the motor, the apparatus is now ready for the recording of the checks.

The operation of the apparatus is controlled by the buttons 50 arranged in spaced relation at the front of the copy board and must be actuated simultaneously. With this arrangement, it is insured that both of the operator's hands are out of the photographic field. Upon each actuation of buttons 50, solenoid 51 is energized to release shutter 31 which is operatively connected to the motor drive for advancing the film and rotating the shutter. Since the motor drive does not form a part of the present invention, it is deemed sufficient to describe the drive as one in which a clutch controls the film advance, the clutch being operative to permit advancement of the film only after an exposure has been made through both of the objectives 29 and 30, as described more fully hereinafter.

With the stack 45 arranged in recess 17, the operator actuates both buttons 50, and upon energization of solenoid 51, the armature is released from stop 52 and shutter 31 is permitted to be rotated until stop 53 engages said armature. During this partial rotation of shutter 31, shutter aperture 32 is moved over objective 29 and a latent image $O_1$, see Fig. 4, of the uppermost check is formed to one side of the film. Since the stack 46 has not yet been formed, only one image is formed by the first exposure made. Rotation of shutter 31 is arrested by stop 53 to prevent an exposure through aperture 33. The operator then transfers the uppermost check in stack 45 to the space adjacent said stack and provided for forming stack 46 and during the transfer turns the check face downward. Buttons 50 are again actuated simultaneously to energize solenoid 51 to release shutter 31. An exposure is then made through objective 30 and aperture 33 and latent images of the reverse side of first document $R_1$ and the obverse side of the second document $O_2$, or uppermost document on stack 45, are formed on the other side of film F. After the exposure has been made through objective 30 and before stop 52' engages the armature of solenoid 51, an unexposed area of film is automatically advanced into the position defined by edges 37 and 40 of gate numbers 35 and 38, respectively. While the film is advanced automatically, it is to be understood that a manual advance of the film is also feasible but requires that the operator remember when exposures have been made through both objectives. The operator again transfers the uppermost document on stack 45 to stack 46 and during the transfer turns the check face downward. The cycle is repeated, first photographing through objective 29 so that latent images $R_2$ and $O_3$ are formed to the right side of film F, transferring and inverting the uppermost check from stack 45 to stack 46, photographing through objective 30 so that latent images $R_3$ and $O_4$ are formed to the left side of film F and advancing an unexposed area of film into the film gate aperture. This method of photographing, through objective 29, transferring and inverting the uppermost check on stack 45 to stack 46, photographing through objective 30 and advancing the film is continued until the last check in stack 45 has been placed on stack 46 in which case only a single image $R_n$ of the reverse side will be formed on film F and will be opposite the latent image $O_n$ of its obverse side or face.

The objectives 29 and 30, as noted in Figs. 2, 3 and 6 are offset in two directions so that in one position, as shown in Fig. 2, the fields overlap and in the other position, as shown in Fig. 3, the fields are spaced apart. As a result, when stacks 45 and 46 are photographed through objective 29, the projected area A, as indicated in Fig. 4, is to the right side of film F. When stacks 45 and 46 are photographed through objective 30, the displacement $d$ shown in Fig. 3, places the projected area B to the left side of film F and displacement $d^1$, as shown in Fig. 2, provides an overlap of areas A and B which is equivalent to substantially one-half the length of said areas longitudinally of said film. This arrangement provides a simple method of collocating the images of each side of the same check in spaced-apart relationship transversely of the film with the images of the obverse and reverse sides of successive checks being alternately spaced longitudinally of the film.

While a preferred embodiment of an apparatus has been disclosed, it is obvious that the method of photographically recording documents as claimed can be practiced by utilizing apparatus having a single objective mounted in a mechanism which will permit movement of the objective both transversely and longitudinally with respect to the film strip, or in other words from one required position to another as alternate exposures are made. It would also be possible to provide an adjustment of the longitudinal displacement for both objectives and for a single objective so that lateral alignment of images of various sizes of documents could be obtained.

While it will be apparent to those skilled in the art that other types of apparatus may be devised for practicing the invention, the scope of the invention is pointed out in the appended claims.

Having now particularly described our invention, what we desire to secure by Letters Patent of the United States and what we claim is:

1. In the photographic recording on a length of film of the obverse and reverse sides of each of a series of documents, the method of collocating the records so that the images of the two sides of each document are adjacent transversely of the film which comprises arranging the documents in a stack, transferring the documents one at a time to another stack and during the transfer turning the document over so that a series of different aspects are presented, and imaging the several aspects on successive areas of said film which are displaced laterally by a distance substantially equal to the width of an area and longitudinally by a distance substantially equal to one-half the length of an area.

2. In the photographic recording on a length of film of the obverse and reverse sides of each of a series of documents, the method of collocating the records so that the images of the two sides of each document are adjacent transversely of the film which comprises arranging the documents in a stack, transferring the documents one at a time to another stack and during the transfer turning the document over so that a series of different aspects are presented, imaging the several aspects on successive areas of said film which are displaced laterally by a distance substantially equal to the width of an area and longitudinally by a distance substantially equal to one-half the length of an area, and advancing said film by an amount equal in length to the length of an area after imaging the several aspects on said successive areas transversely of the film.

3. In the photographic recording on a length of film of the obverse and reverse sides of each of a series of documents, the method of collocating the records so that the images of the two sides of each document are adjacent transversely of the film which comprises arranging a plurality of documents in a pair of adjacent stacks, imaging the uppermost document on both stacks in one area on said film to form latent images thereof, transferring the documents one at a time from one stack to the other of said stacks and during the transfer turning the document over so that a series of different aspects are presented, imaging the uppermost document on both stacks in another area of said film displaced laterally thereof by a distance substantially equal to the width of said first-mentioned area and longitudinally of said film by a distance substantially equal to one-half the length of said area to form latent images thereof, and advancing an unexposed area of film into an exposure position after two aspects of said stacks have been imaged on said film.

4. In the photographic recording on a length of film of the obverse and reverse sides of each of a series of documents, the method of collocating the records so that the images of the two sides of each document are adjacent transversely of the film which comprises arranging a plurality of documents in a pair of adjacent stacks, imaging the uppermost document on both stacks in one area on said film to form latent images thereof, transferring the documents one at a time from one stack to the other of said stacks and during the transfer turning the document over so that a series of different aspects are presented, imaging the uppermost document on both stacks in another area of said film displaced laterally thereof by a distance substantially equal to the width of said first-mentioned area and longitudinally of said film by a distance substantially equal to one-half the length of said area to form latent images thereof, the images of the obverse and reverse sides of the same document being in spaced-apart relationship transversely of said film and the obverse and reverse images of successive documents being alternately spaced longitudinally of said film, and advancing an unexposed area of film into an exposure position after two aspects of said stacks have been imaged on said film.

5. In the photographic recording on a length of film of the obverse and reverse sides of each of a series of documents, the method of collocating the records so that the images of the two sides of each document are adjacent transversely of the film which comprises arranging a plurality of documents in a pair of adjacent stacks, adjusting the exposure aperture in accordance with the combined width of said stacks, imaging the uppermost document on both stacks in an area to one side of said film to form latent images of said documents, transferring the documents one at a time from one stack to the other of said stacks and during the transfer turning the document over so that a series of different aspects are presented, imaging the uppermost document on both stacks in an area on the other side of said film which is displaced laterally thereof by a distance substantially equal to the width of said first-mentioned area and longitudinally of said film from said first-mentioned area by a distance substantially equal to one-half the length of said area, to form latent images of said documents, the images of the obverse and reverse sides of the same document being in spaced-apart relationship transversely of said film and the obverse and reverse sides of successive documents being alternately spaced longitudinally of said film, and advancing an unexposed area of film into said exposure aperture after two aspects of said stacks have been imaged on said film.

References Cited in the file of this patent

UNITED STATES PATENTS

| Number | Name | Date |
| --- | --- | --- |
| 2,494,599 | Weckbaugh | Jan. 17, 1950 |
| 2,508,650 | Pratt | May 23, 1950 |